(12) United States Patent
Bertolini

(10) Patent No.: US 10,239,288 B2
(45) Date of Patent: Mar. 26, 2019

(54) GLASS PANE CONSTRUCTION

(71) Applicant: ISOCLIMA S.p.A., Este (Padua) (IT)

(72) Inventor: Alberto Bertolini, Este (IT)

(73) Assignee: ISOCLIMA S.P.A., Este (IT)

( * ) Notice: Subject to any disclaimer, the term of this patent is extended or adjusted under 35 U.S.C. 154(b) by 716 days.

(21) Appl. No.: 14/367,754

(22) PCT Filed: Sep. 28, 2012

(86) PCT No.: PCT/EP2012/004078
§ 371 (c)(1),
(2) Date: Jun. 20, 2014

(87) PCT Pub. No.: WO2013/091743
PCT Pub. Date: Jun. 27, 2013

(65) Prior Publication Data
US 2015/0024184 A1    Jan. 22, 2015

(30) Foreign Application Priority Data

Dec. 23, 2011  (DE) .................. 10 2011 122 199
Feb. 10, 2012  (DE) .................. 10 2012 002 661

(51) Int. Cl.
*B32B 17/10*  (2006.01)
*F41H 5/04*  (2006.01)

(52) U.S. Cl.
CPC .... *B32B 17/10045* (2013.01); *B32B 17/1044* (2013.01); *B32B 17/1077* (2013.01); *B32B 17/10458* (2013.01); *B32B 17/10504* (2013.01); *B32B 17/10513* (2013.01); *B32B 17/10752* (2013.01); *B32B 17/10779* (2013.01);
(Continued)

(58) Field of Classification Search
CPC .......... B32B 17/10045; B32B 17/1044; B32B 17/10458; B32B 17/10504; B32B 17/10513; B32B 17/10752; B32B 17/1077; B32B 17/10779; B32B 17/10788; B32B 2307/416; B32B 2369/00; F41H 5/0407;
(Continued)

(56) References Cited

U.S. PATENT DOCUMENTS 5,239,406 A    8/1993  Lynam
5,506,051 A *  4/1996  Levy-Borochov ...... B29C 41/22
                                                  428/212
(Continued)

OTHER PUBLICATIONS

Definition of Foil.*
International Search Report dated Jan. 30, 2013 in PCT Application PCT/EP2012/004078, 3 pages.

*Primary Examiner* — Travis M Figg
(74) *Attorney, Agent, or Firm* — Hauptman Ham, LLP

(57) ABSTRACT

The present invention relates to a glass pane construction, particularly bullet proof glass pane, to be used in a motor vehicle, having several transparent panes and layers made of glass, ceramic or synthetic material, which are connected in a layered manner connected to each other in a laminate, electrical controllable or switchable electrochromic layer means for electrical controlling or switching of the light transparency of the glass pane construction or of the bullet proof pane, wherein a laminar transparent UV filtering layer means for filtering of striking ultraviolet (UV) radiation is provided so that none or only a part of the UV radiation passes to the electrochromic layer means.

11 Claims, 5 Drawing Sheets

Figure 1:
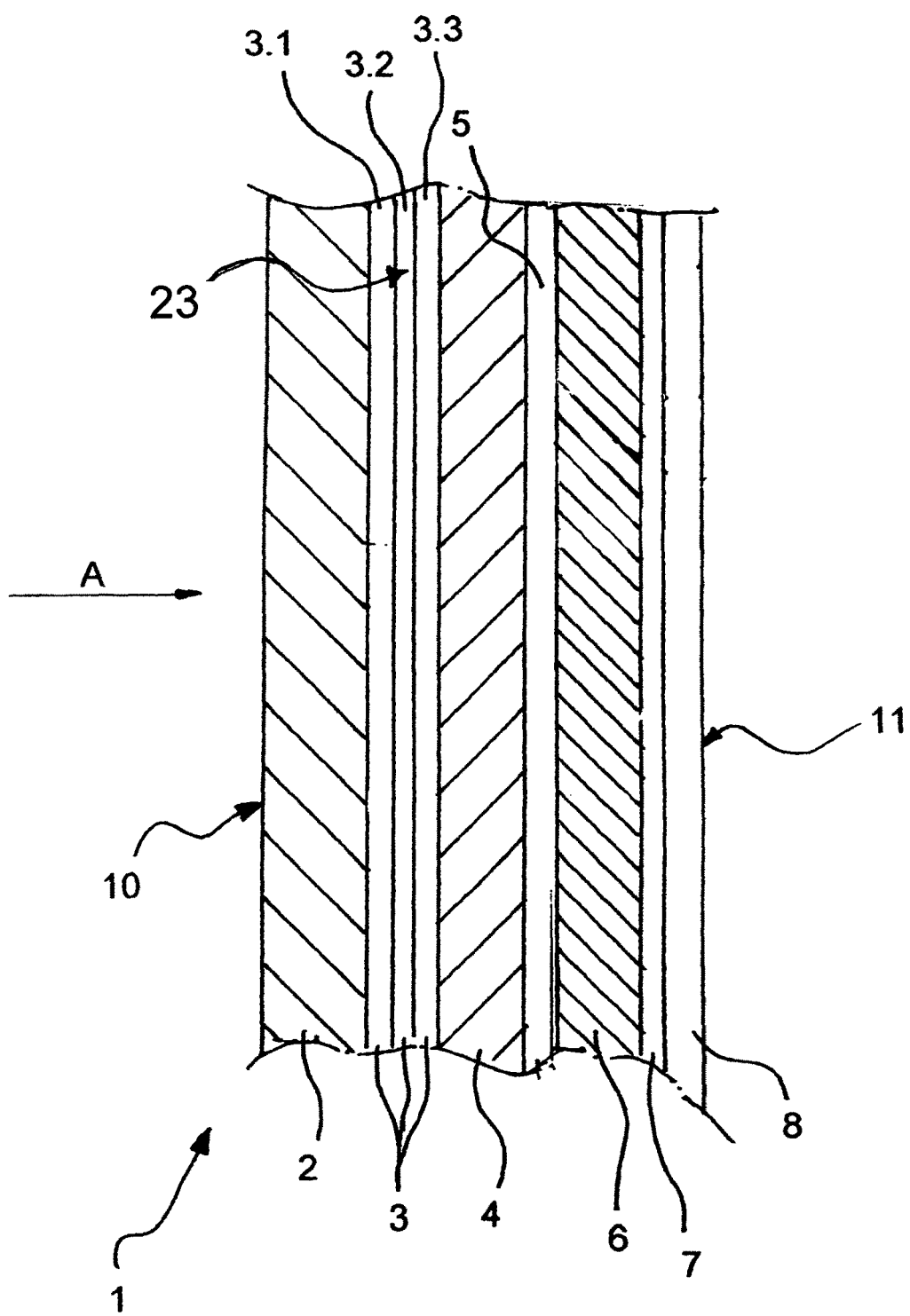

(52) U.S. Cl.
CPC ..... *B32B 17/10788* (2013.01); *F41H 5/0407* (2013.01); *B32B 2307/416* (2013.01); *B32B 2369/00* (2013.01); *Y10T 428/24983* (2015.01); *Y10T 428/3163* (2015.04); *Y10T 428/31507* (2015.04); *Y10T 428/31551* (2015.04); *Y10T 428/31601* (2015.04); *Y10T 428/31616* (2015.04); *Y10T 428/31649* (2015.04)

(58) Field of Classification Search
CPC .......... F41H 2307/416; F41H 2369/00; Y10T 428/24983; Y10T 428/31507
See application file for complete search history.

(56) References Cited

U.S. PATENT DOCUMENTS

| | | | |
|---|---|---|---|
| 6,280,826 B1 | 8/2001 | Woell et al. | |
| 6,466,298 B1* | 10/2002 | Fix | B32B 17/10 349/16 |
| 6,800,337 B1* | 10/2004 | Siemensmeyer | C03C 17/32 252/299.01 |
| 2003/0137632 A1* | 7/2003 | Kawabata | C09K 19/54 349/156 |
| 2006/0193999 A1* | 8/2006 | Verall | C08J 5/18 428/1.1 |
| 2009/0115922 A1* | 5/2009 | Veerasamy | B32B 17/10 349/16 |
| 2011/0170170 A1* | 7/2011 | Boote | B32B 17/10174 359/296 |

\* cited by examiner

GLASS PANE CONSTRUCTION

RELATED APPLICATIONS

The present application is National Phase of International Application Number PCT/EP2012/004078 filed Sep. 28, 2012 and claims priority to German Application Number 10 2011 122 199.2 filed Dec. 23, 2011 and German Application Number 10 2012 002 661.7 filed Feb. 10, 2012.

The present invention refers to a glass pane construction and, particularly, it refers also to a bullet proof pane for usage in a motor driven vehicle according to the preamble of claim 1.

A known bulletproof pane is described, for instance, in EP 1010963 B1. The transparent laminated bulletproof pane comprises several transparent panes or layers of glass or synthetic material which are connected with each other, wherein particularly one or several laminated layers of synthetic material like, for instance, polyurethane and polyvinyl butyral or other thermoplastic materials are provided between the panes of glass, bulletproof glass or polycarbonate for forming the laminate. The bulletproof window may comprise a pane or layer made of polycarbonate directed to the inside of the vehicle.

If such a laminated bulletproof pane is subjected to the natural sunlight over a longer time period of, for instance, a few years, the characteristics of the layers made of synthetic or plastics material can degrade. Particularly, the transparent layers made of synthetic material of the bulletproof window may become more turbid or cloudy resulting in a degrading transparency for visible light. Further, a lasting radiation with natural sunlight can also result in an increasing brittleness of the layers made of plastic degrading the strong lamination of the bulletproof pane.

It is, therefore, an object of the invention to provide a glass pane construction that reduces degrading of characteristics like becoming more turbid or brittleness.

This object is solved by the glass pane construction according to claim 1. Accordingly, the transparent glass pane construction of the invention, which particularly may be used as a bullet proof pane in a motor driven vehicle, comprises several transparent panes and layers made of glass, ceramic, or synthetic material or plastic, which are connected in a layered manner in a laminate, and a transparent UV filtering layer means for filtering of ultraviolet (UV) radiation of the natural sunlight impinging. Accordingly, only a part of the UV radiation or none of the UV radiation in best case can pass to the panes and layers of plastics or synthetic material to reduce or even avoid negative aging effects of the plastic layers like brittleness and cloudiness. The glass pane construction of the invention has the decisive advantage that the required transparency can be maintained due to the UV filtering means even over a long time period of usage.

Preferably, the UV filtering layer means works in a wavelength range of the electro magnetic UV radiation between approximately 300 and approximately 400 nm to be able to restrain such UV radiation. Visible light that is sun radiation in a range of wavelength between approximately 400 to 750 nm is passed quite completely by the UV filter as required for use as vehicle window.

The glass pane construction of the invention may have UV filtering layer means comprising one reflecting layer or several reflecting layers for reflecting of UV radiation. Particularly, the UV filtering means comprises at least one cholesteric layer reflecting UV radiation.

Preferably, the UV filtering layer means is provided before laminating of the glass pane construction as a foil since this foil is quite easy to use. Further, the foil can be built in or integrated quite easily into the laminate of the security glass construction or bullet proof window like a thermoplastic foil being an intermediate layer of the laminate.

An outer pane of the glass pane construction according to the invention can consist of glass or vitreous ceramic wherein the UV filtering layer means adjoins the outer pane directly. An outer pane and at least one further pane of glass, glass ceramic, or synthetic material, particularly polycarbonate, can be provided, wherein the UV filtering layer means or UV filtering foil is arranged between the outer pane and the further pane in a laminate and adjoins thereto. The UV filtering layer means may be a foil, particularly an adhesive or gluing foil, and it is arranged between a first pane or layer and a second pane or layer of glass, glass ceramic, or synthetic material, particularly polycarbonate in order to ensure protection of the subsequent layers of synthetic material or laminated layers against UV radiation.

The present invention refers also to a glass pane construction having an electrochromic layer means for controlling the transparency of the glass pane construction.

An electrochromic light-damping device is described in DE 698 10 776 T2, wherein the function thereof is based on organic compounds. Also DE 10 2008 030 441 B3 describes a known electrochromic layered means that is called a light valve assembly and that is used in a glazing of vehicles. The known light valve assembly being electrically switchable comprises in a laminate two opposite substrate foils with electrically conductive electrodes mounted thereon and a light valve layer or electrochromic layer there between. The electrodes consist of inorganic materials like for example light transparent and conductive oxides. The substrate foils are made of synthetic material or plastic. The light valve layer comprises organic compounds or suspended valve drops that can be aligned in an electrical field, which can be generated by supplying of an electrical voltage to the electrodes. If the light valve compounds of the electrochromic layer are aligned by supplying a voltage the transparency of the light valve arrangement is high.

If, in contrast, no voltage is applied to the light valve, the compounds are disordered in their alignment and the light transparency is only minimal.

It was found out that the required transparency of a glass pane construction with built-in electrochromic layered means degrades with time if the glass pane construction is exposed to natural sun light.

It is, therefore, also an object of the present invention to provide a glass pane construction having electrochromic layered means and being able to maintain a high transparency even for a long time period.

This object is solved by the glass pane construction with electrochromic layered means according to claim 1. Accordingly, the transparent glass pane construction of the invention, which in particularly may be used as a bullet proof pane in a motor driven vehicle, comprises several transparent panes and layers made of glass, ceramic, or synthetic material, which are in a layered manner connected to each other in a laminate, electrically controllable or switchable electrochromic layered means or foil for electrical controlling or switching of the light transparency of the glass pane construction or of the bullet proof pane and laminar transparent UV filtering layer means or a UV filtering foil for filtering of ultra violet (UV) radiation of the natural sunlight so that no or only a part of the UV radiation passes to the electrochromic layer means.

The glass pane construction of the present invention having an electrochromic layer thus has the decisive advantage that the specified high transparency is maintained also within a long time period of use due to UV filtering means. It was found out that it can be avoided by the UV filtering layer in the glass pane construction of the invention that the ultra violet radiation of the sunlight impinges onto the electrochromic layer, by interaction between the UV radiation and the organic and electrochromic compounds of the electrochromic layer thus, can be avoided, which otherwise would lead to degrading of transparency of the electrochromic layer.

The UV filtering means of the invention is able to absorb and/or to reflect the UV radiation of the solar radiation at least in part.

Preferably, the UV filtering layer means works in a wavelength range of the electro magnetic UV radiation between approximately 300 and approximately 400 nm to be able to restrain such UV radiation. Visible light that is sun radiation in a range of wavelength between approximately 400 to 750 nm is passed completely quite by the UV filter as required for use as vehicle window.

The glass pane construction of the invention may have UV filtering layer means comprising one reflecting layer or several reflecting layers for reflecting of UV radiation. Particularly, the UV filtering means comprises at least one cholesteric layer reflecting UV radiation.

Preferably, the UV filtering layer means is provided before laminating of the glass pane construction as a foil since this foil is quite easy to use. Further, the foil can be built in or integrated quite easily into the laminate of the security glass construction or bullet proof pane like a thermoplastic foil being an intermediate layer of the laminate.

Preferably, the UV filtering means comprises at least one cholesteric layer having a cholesteric compound or component or a cholesteric mixture of compounds or components in cured state which are selected from:
at least one cholesteric polymerisable monomer;
at least one achiral, nematic polymerisable monomer and a chiral compound;
at least one cholesteric polymerisable polymer;
at least one cholesteric polymer in a polymerisable solvent;
at least one cholesteric polymer whose cholesteric face can be frozen in by rapid cooling to below the glass transition temperature; and/or
at least one achiral liquid/crystalline cross linkable polymer and achiral compound. These components are explained in detail in DE 197 45 647 A1.

The cholesteric layer is preferably designed to have a maximum of reflection at ultra violet wavelengths $\lambda$ in the range between approximately 300 to 400 nm. Particularly the cholesteric layer may have a maximum of reflection in ultra violet wavelength of approximately $\lambda=350$ nm whereby a secure decline of the ability of reflection in direction to the visible wavelengths range is enabled.

Further, the cholesteric layer may comprise a mixture of a chiral component and a nematic component, the chiral component has a concentration of approximately 0.031 in molar fraction and the nematic component having a concentration of approximately 0.969 in molar fraction and the wavelength of the maximum of reflection is in the region of wavelengths $\lambda$ between approximately 320 to 380 nm, particularly at $\lambda=350$ nm. By adjusting the concentrations of both components of the cholesteric layer the maximum of reflection of the UV filter could be determined.

The UV filtering layer means may comprise in laminate a first cholesteric layer, a second cholesteric layer, and a $\lambda/2$ layer or $\lambda/2$ foil being arranged between the cholesteric layers, whereby the $\lambda/2$ layer reverses the circular polarisation of the impinging UV radiation and both cholesteric layers have unequal or equal pitch and/or unequal or equal handedness, preferably the same pitch and handedness to increase the ability of UV reflection. The UV reflection can even be considerably increased into a range of 80% or even more than 90%, wherein the light transparency of the UV filter amounts to even more than 90% in the visible range of spectrum.

Preferably a laminated layer sequence may be realised of a UV filter layer means and an electrochromic layer means to facilitate the production of the laminated pane.

The layer sequence in the laminate made of the UV filtering layer means and electrochromic layer means may comprise a cholesteric layer, a thermoplastic layer, a first electrode layer, an electrochromic layer, and a second electrode layer to allow a compact construction.

The layered sequence of laminate consisting of UV filtering layer means and electrochromic layer means may comprise a first cholesteric layer, $\lambda/2$ layer or $\lambda/2$ foil, a second cholesteric layer, a thermoplastic layer, a first electrode layer, an electrochromic layer, and a second electrode layer, wherein the $\lambda/2$ layer reverses the circular polarisation of the impinging UV radiation and both cholesteric layers have the same pitch and handedness to obtain a facilitated production together with a very high UV reflection.

The substrate layers and the thermoplastic layers may consist respectively of a thermoplastic material like polyethylene terephtalate (PET), polymethyl methacrylate (PMMA), polycarbonate (PC), polyvinyl butyral (PVB) or ethylenevinyl acetate (EVA), or preferably polyurethane (PU) since they are available as foils.

Further advantageous embodiments of the present invention are mentioned in the subclaims.

Figure 2:
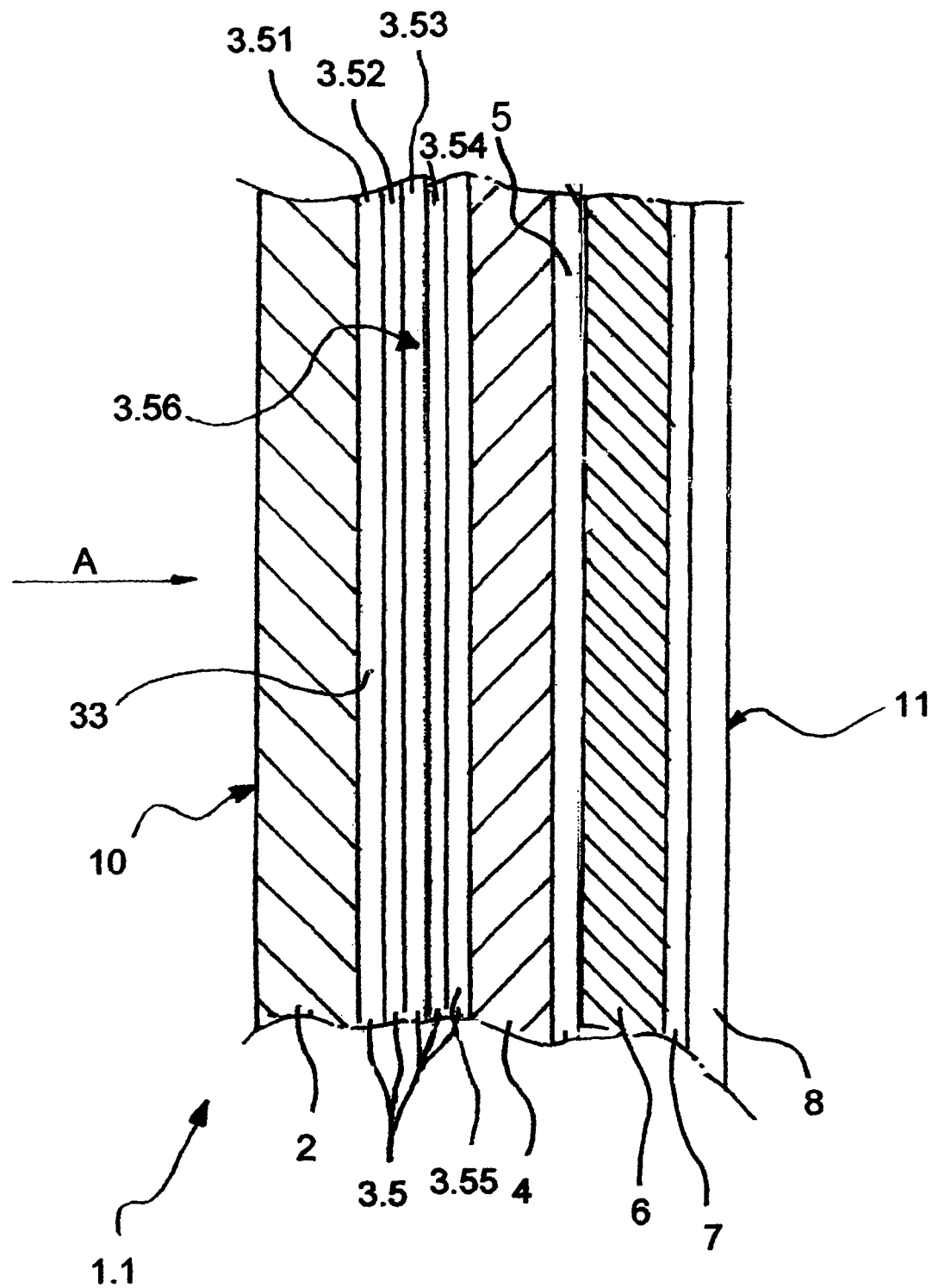
Figure 3:
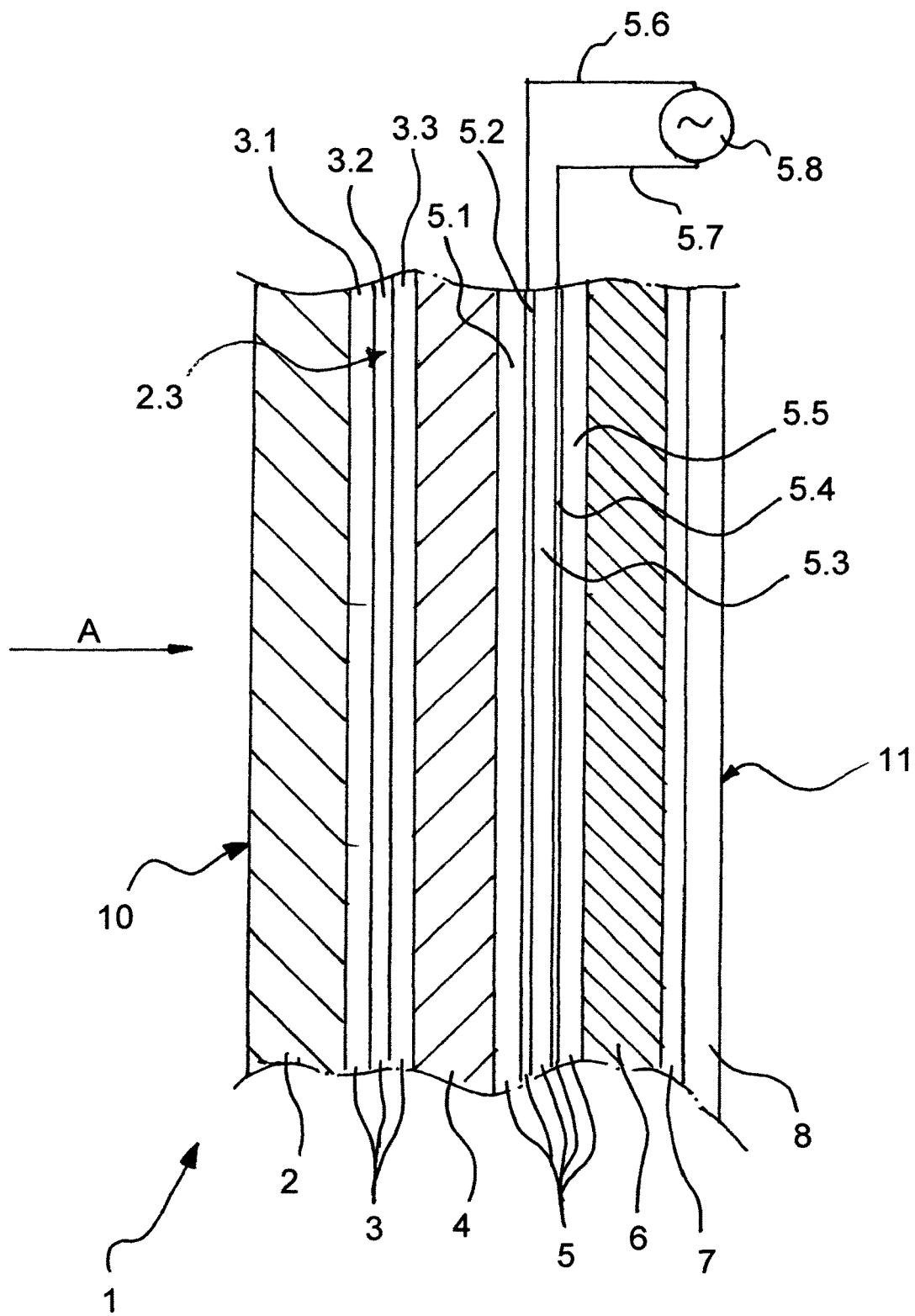
Figure 4:
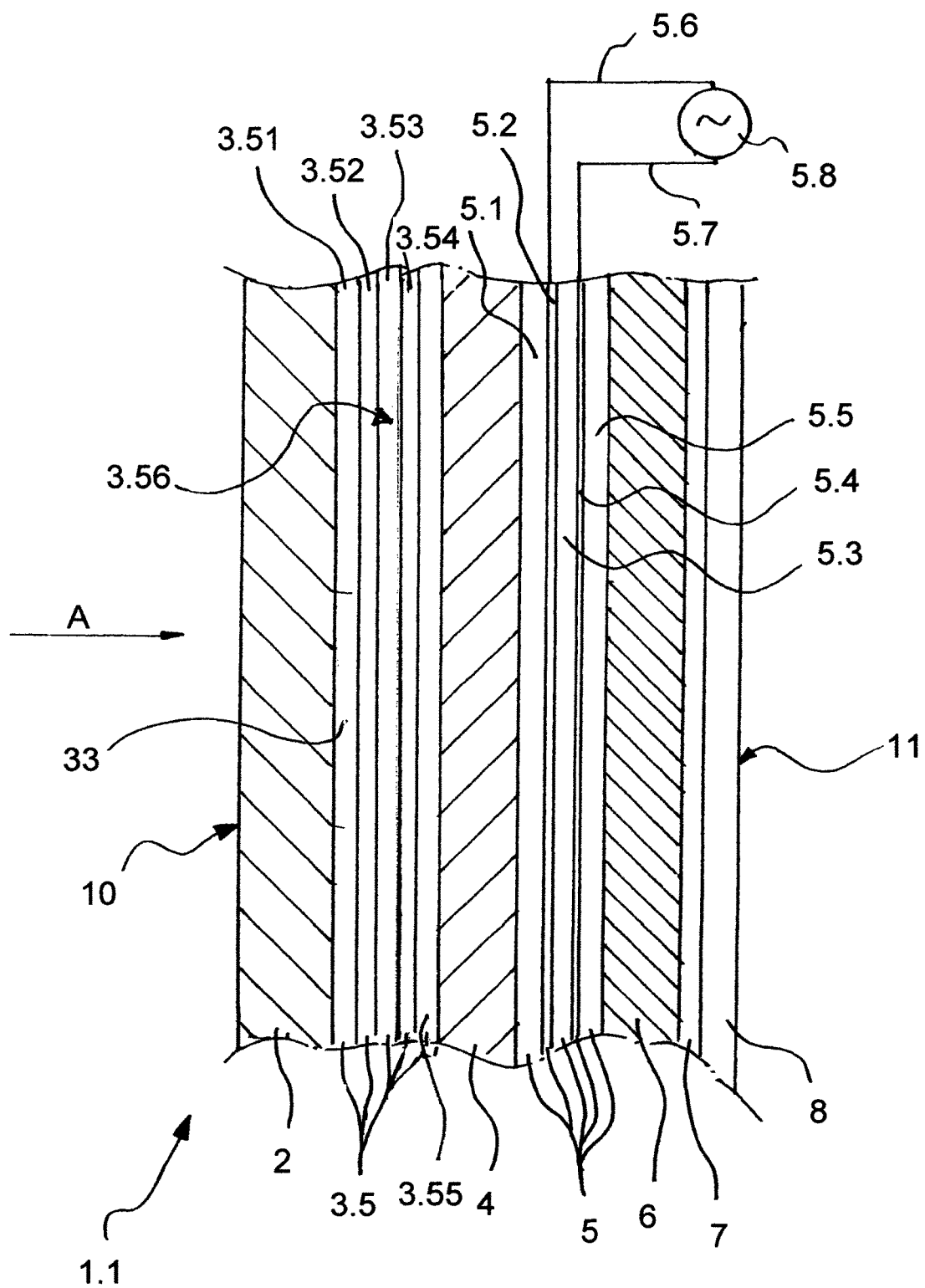
Figure 5:
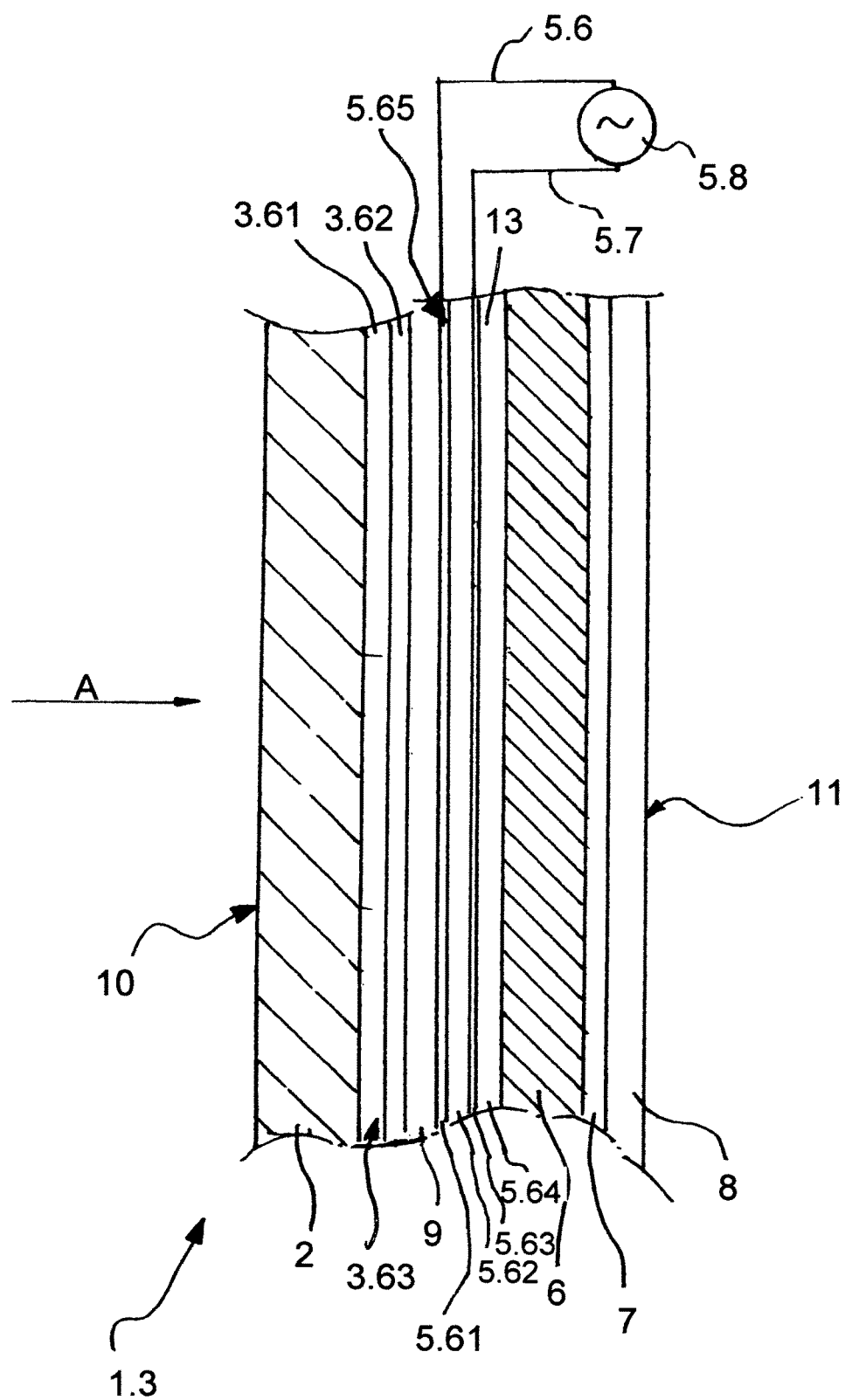

Further advantages, advantageous embodiments, and utilisations of the invention could be taken from the following description of exemplified and preferred embodiments of the invention in connection with the drawings that show:

FIG. 1 a schematic partial section view of a glass pane construction of the invention according to an exemplified embodiment of the invention in the form of a bulletproof pane comprising UV filtering layer means;

FIG. 2 a schematic partial section view in part of a glass pane construction of the invention in a further exemplified embodiment of the invention in the form of a bulletproof pane comprising UV filtering layer means;

FIG. 3 a schematic partial section view of a glass pane construction of the invention according to an exemplified embodiment of the invention in the form of a bullet proof pane comprising electrochromic layer means and UV filtering layer means;

FIG. 4 a schematic partial section view in part of a glass pane construction of the invention in a further exemplified embodiment of the invention in the form of a bullet proof pane comprising electrochromic layer means and UV filtering layer means having $\lambda/2$ sheet; and FIG. 5 a schematic section view in part of a glass pane construction of the invention in a further exemplified embodiment of the invention in the form of a bulletproof pane comprising electrochromic layer means and UV filtering layer means.

FIG. 1 shows a schematic partial section view of the glass pane construction of the invention in a preferred embodiment of invention in the form of a bulletproof pane 1 having UV (ultra violet) filtering layer means 3 reflecting UV radiation. The bulletproof or bullet resistant glass pane 1 is constructed as a laminated pane or window and may be used, for instance, as windscreen, lateral window, or rear window of a motor driven vehicle or automobile.

The bullet proof pane 1 of the invention has laminated glass panes 2, 4 and 6 of the same shape and made of, for instance, of bulletproof glass, the inner glass pane 6 is arranged inside of the vehicle, the outer glass pane 2 is arranged outside of the vehicle, and the middle glass pane is arranged between the outer glass pane 2 and the inner glass pane 6. An outer face 10 of the bullet proof pane 1 and a side of the vehicle onto which bullets are striking or impinging is marked by the arrow A in FIG. 1 being directed onto the outer glass pane 2. The UV filtering layer means 3 extends between the outer glass pane 2 and the middle glass pane 4 which is constructed by multiple layers and which reflects ultra violet (UV) radiation being comprised by the spectrum of the natural sunlight that impinges onto the outer face 10 of the bullet proof pane 1 or outer glass pane 2 in direction of the arrow A. A laminated adhesive layer 5, for instance, of polyurethane or polyvinyl butyral, is arranged between middle glass pane 4 and the inner glass pane 6. A sequence of layers comprising a polyurethane layer 7 and a pane 8 made of polycarbonate may be formed on the inner surface of the inner glass pane 6 in this order in the same shape. An inner side 11 of the bullet proof pane 1 corresponds to the inner surface of the polycarbonate pane 8 that prevents glass splitters to enter into the interior of the vehicle. Consequently, the bullet proof glass pane 1 has a layered construction seen from outside to inside comprising the glass pane 2, the UV filtering layer means 3 comprising several layers, the glass pane 4, the inner glass pane 6, the polyurethane layer 7, and the polycarbonate layer 8. All these panes and layers have a high transparency of visible light.

The multi-layered UV filtering layer means 3 comprises a first outer polyurethane layer 3.1 adjoining the outer glass pane 2, a second inner polyurethane layer 3.3 adjoining the middle glass pane 4, and a UV filtering layer 3.2 being arranged between the polyurethane layers 3.1 and 3.3. The whole UV filtering layer means 3 may be designed as a foil and it reflects UV radiation in a wavelength range of approximately 300 nm to 400 nm corresponding approximately to the UV-A range of the UV radiation of the natural sunlight.

The UV filtering layer 3.2 comprises a cholesteric layer containing a mixture having a chiral component and a nematic component, the chiral component having a concentration of approximately 0.031 in molar fraction or molar relation and the nematic component having a concentration of approximately 0.969 in molar fraction or molar relation. The wavelength of the reflection maximum of this mixture amounts to approximately 350 nm whereby high reflection ability is obtained in UV radiation wavelengths range from 300 nm up to 400 nm.

The nematic component may comprise a nematic monomer having the formula N1

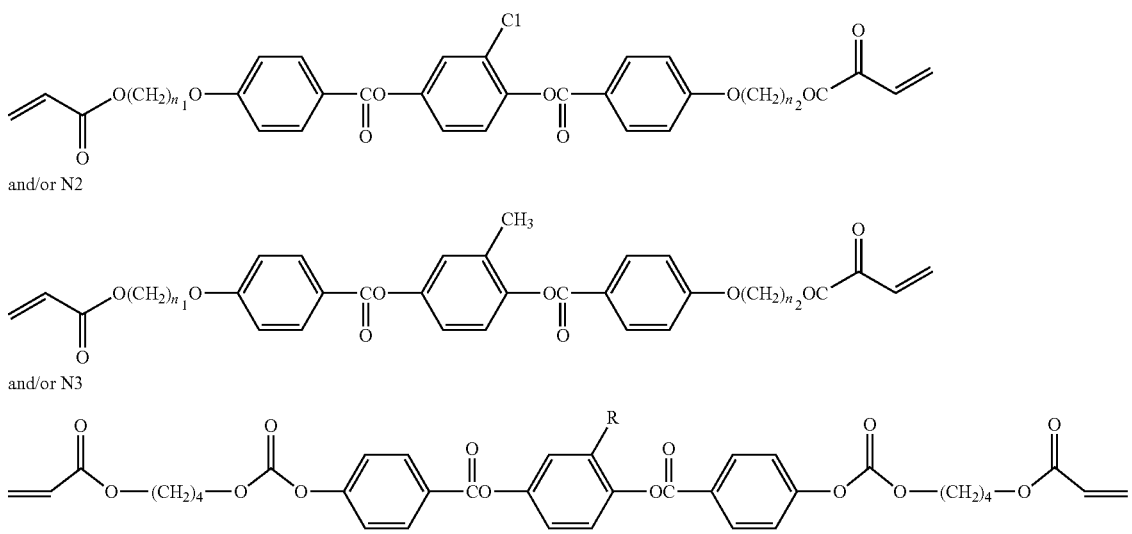

and/or N2 and/or N3 with R=H, Cl or $CH_3$ and $n_1$ and $n_2$ are respectively 2, 4, 6, etc. in a preferred embodiment. The chiral component comprises a compound with the formula C1

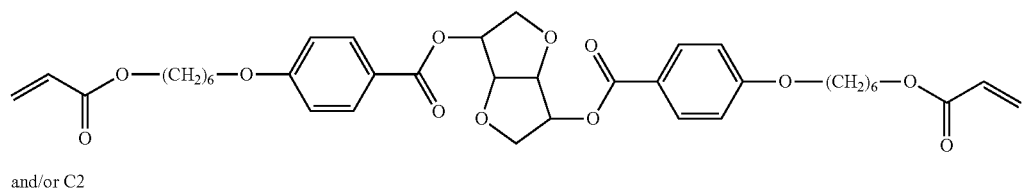

and/or C2

-continued

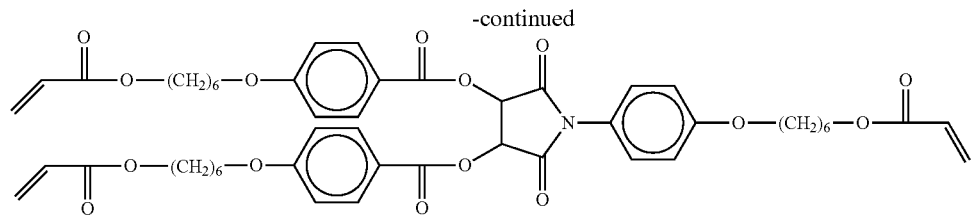

The UV filtering layer 3.2 may comprise additional components like diluents, photo initiators, bonding agents, and levelling agents in small amounts.

Before the whole bulletproof pane 1 is produced as a laminate using heat and pressure in an autoclave, the UV filtering layer means 3 is produced as a foil 23.

During production, a cholesteric UV filtering layer 3.2 having a thickness of 30 μm using a wet process is applied on a foil made of thermoplastic polyurethane used as substrate corresponding to the polyurethane layer 3.1 by using, for instance, a doctor blade. The cholesteric layer 3.2 contains a mixture comprising the nematic monomer of formula N1 and the chiral component of formula C1, wherein the concentration of the nematic monomer N1 amounts to approximately 0.969 in molar fraction and wherein the concentration of the chiral component C1 amounts to approximately 0.031 in molar fraction. Cellulose acetate butyral can be added to improve the building of the layer. Butyl acetate may be used as solvent. 2,4,6-trimethylbenzoyldiphenylphosphine oxide may be added to the mixture in small concentration as photo initiator. After applying the cholesteric mixture, a UV light source is used for radiating after the solvent was lost in order to obtain a curing of the layer. Then a further foil 3.3 made of thermoplastic polyurethane is arranged on the UV filtering layer 3.2 to prepare the foil 23 as UV filtering layer means 3.

The layers 3.1 and 3.3 or also 5 and 7 can respectively consist of thermoplastic material or foil material as, for instance, polyethylene terephtalate (PET), polymethyl methacrylate (PMMA), polycarbonate (PC), polyvinyl butyral (PVB), or ethylene-vinyl acetate (EVA), or preferably polyurethane (PU).

The thicknesses of the outer glass pane 2 and the middle glass pane 4 could amount to 4 mm, respectively, and the thickness of the inner glass pane may be 6 mm. The thicknesses of the polyurethane layers 3.1, 3.3, and 5 each may be 1 mm. The thickness of the polyurethane layer 7 may be 1.9 mm and the thickness of the polycarbonate layer 8 may be 2.5 mm.

Since the UV filtering layer means 3 reflects the UV radiation of the natural sunlight substantially or a big part thereof, the UV radiation cannot pass to the subsequent layers 3.3, 5, 7, and 8 of plastic or synthetic material whereby negative aging effects of these plastic layers like increasing brittleness and cloudiness can be prevented.

FIG. 2 shows a schematic partial section view of a glass pane construction of the invention in a further exemplified embodiment of the invention in the form of a bulletproof pane 1.1 having a UV filtering layer means 3.5 reflecting UV radiation of the natural sunlight. The bullet resistant glass pane 1.1 is constructed as a laminated pane and it may be used, for instance, as a window of an automobile.

The bullet proof glass pane 1.1 of the invention has glass panes 2, 4 and 6 arranged in a laminate wherein the inner glass pane 6 is arranged inside of the vehicle, the outer glass pane 2 is arranged outside of the vehicle and the middle glass pane is arranged between the outer glass pane 2 and the inner glass pane 6. An outer face 10 of the bullet proof glass pane 1 and, therefore, the side of the vehicle onto which bullets strike is marked by the arrow A in FIG. 2 which is directed onto the outer glass pane 2. The UV filtering layer means 3.5 extends between the outer glass pane 2 and the middle glass pane 4 which is constructed by multiple layers and which reflects ultra violet (UV) radiation being comprised by the spectrum of the natural sunlight that impinges onto the outer surface 10 of the bullet proof glass pane 1.1.

A laminated adhesive layer 5, for instance, of polyurethane or polyvinyl butyral, is arranged between middle glass pane 4 and the inner glass pane 6. A sequence of layers comprising a polyurethane layer 7 and a pane 8 made of polycarbonate may be formed on the inner face of the inner glass pane 6 in this order in the same shape. An inner side 11 of the bullet proof pane 1.1 corresponds to the inner face of the polycarbonate pane 8. The bullet proof glass pane 1.1 consequently has a layered construction seen from outside to inside comprising the glass pane 2, the UV filtering layer means 3.5, the glass pane 4, the adhesive layer 5, the inner glass pane 6, the polyurethane layer 7, and the polycarbonate layer 8. All these panes and layers have a high transparency for visible light.

The UV filtering layer means 3.5 has a first outer polyurethane layer 3.51 or another thermoplastic foil adjoining the outer glass pane 2, a second inner polyurethane layer 3.55 or another thermoplastic foil adjoining the middle glass pane 4, and a UV filtering layer 3.56 being arranged between the polyurethane layers 3.51 and 3.55 in a laminate. The whole UV filtering layer means 3.5 may be designed as a separate foil before assembling the bullet proof pane 1.1 and it reflects UV radiation of the sun spectrum in a range of the wavelength of approximately 300 nm to 400 nm.

The UV filtering layer 3.56 comprises a first cholesteric layer 3.52 and a second cholesteric layer 3.54 each containing a mixture having a chiral component and a nematic component, and each having the same handedness and pitch, wherein the chiral component having a concentration of approximately 0.031 in molar fraction and the nematic component having a concentration of approximately 0.969 in molar fraction. The wavelength of the reflection maximum of this mixture amounts to approximately 350 nm whereby high reflection ability is obtained in the UV radiation wavelength range from 300 nm up to 400 nm. The nematic component comprises a nematic monomer having the formula N1 and/or N2 and/or N3 as it is described in detail with regard to FIG. 1. The chiral component comprises a compound having the formula C1 and/or C2. The cholesteric layers 3.52 and 3.54 respectively may contain additional components like solvents, photo initiators, bonding agents, and levelling agents in small amounts.

The UV filtering layer 3.56 comprises a λ/2 foil 3.53 or λ/2 layer or λ/2 plate which is arranged between the first cholesteric layer 3.52 and the second cholesteric layer 3.54 in a laminated arrangement. The λ/2 foil 3.53 reverts the direction of circulation of the circular polarised UV radiation passing there through. This three layer construction of the UV filtering layer 3.5 provides very high values of UV reflection between 80 and 90% and values of transmittance in the visible spectrum or light of more than 90%.

The UV filtering layer means 3.5 is produced as a foil 33 before the whole bullet proof glass pane 1.1 is laminated in an autoclave. During the production of the UV filtering foil, the cholesteric layer 3.52 or UV filtering layer is applied on a foil made of thermoplastic polyurethane or another thermoplastic material being used as substrate according to the polyurethane layer 3.51 by using, for instance, a doctor blade in a thickness of 30 μm using a wet process. The cholesteric layer 3.52 contains a mixture comprising the nematic monomer of formula N1 and the chiral component of formula C1, wherein the concentration of the nematic monomer N1 amounts to approximately 0.969 in molar fraction and wherein the concentration of the chiral component C1 amounts to approximately 0.031 in molar fraction.

Cellulose acetate butyral can be added. Butyl acetate can be used as a solvent. 2,4,6-trimethylbenzoyldiphenylphosphine oxide is added to the mixture in small concentration as photo initiator. After depositing the cholesteric mixture, a UV light source is used for radiating after the solvent was lost in order to obtain a curing of the layer. Thereafter the λ/2 foil 3.53 is put on the cholesteric layer 3.52.

The second cholesteric layer 3.54 is then applied on the λ/2 foil 3.53 again by using, for instance, a doctor blade in a thickness of 30 μm using a wet process. The second cholesteric layer 3.54 also contains a mixture comprising the nematic monomer of formula N1 and the chiral component C1 wherein also in this case the concentration of the nematic monomer N1 amounts to approximately 0.969 in molar fraction and wherein the concentration of the chiral component amounts to approximately 0.031 in molar fraction. Cellulose acetate butyral can be added to improve the forming of the layer. Butyl acetate can be used as solvent. 2,4,6-trimethylbenzoyldiphenylphosphine can be used as photo initiator in the mixture in small concentration.

After depositing of the second cholesteric layer 3.54, a further foil 3.55 made of thermoplastic polyurethane or another thermoplastic material is deposited on the second cholesteric layer 3.54 after escape of the solvent to produce the UV filtering layer means 3.5 as a foil 33.

FIG. 3 shows a schematic partial section view of the glass pane construction of the invention in a preferred embodiment of invention in the form of a bullet proof pane 1 having electrochromic layer means 5 and UV filtering layer means 3. The bullet proof or bullet secure glass pane 1 is constructed as laminated pane and may be used for instance as windscreen, lateral window, or rear window of a motor driven vehicle or automobile.

The bullet proof pane 1 of the invention has laminated glass panes 2, 4 and 6 of the same shape and made of, for instance, of bullet proof glass, the inner glass pane 6 is arranged inside of the vehicle, the outer glass pane 2 is arranged outside of the vehicle and the middle glass pane is arranged between the outer glass pane 2 and the inner glass pane 6. An outer face 10 of the bullet proof pane 1 and a side of the vehicle onto which bullets are striking or impinging is marked by the arrow A in FIG. 3 being directed onto the outer glass pane 2. The UV filtering layer means 3 extends between the outer glass pane 2 and the middle glass pane 4 which is constructed by multiple layers and which reflects ultra violet (UV) radiation being comprised by the spectrum of the natural sunlight that impinges onto the outer face 10 of the bullet proof pane 1 or outer glass pane 2 in direction of the arrow A. The electrochromic layer means 5 is arranged between the middle glass pane 4 and the inner glass pane 6 which is constructed by multiple layers and which has a light transparency being controlled or switched by an electrical voltage source 5.8 being applied. The electrochromic layer means 5 has the same shape as the UV filtering layer means 3. A sequence of layers comprising a polyurethane layer 7 and a pane 8 made of polycarbonate in this sequence may be formed on the inner face of the inner glass pane 6 in this sequence in the same shape. An inner side 11 of the bullet proof pane 1 corresponds to the inner face of the polycarbonate pane 8 that prevents glass splitters to enter into the interior of the vehicle. The bullet proof glass pane 1 consequently has a layered construction seen from outside to inside comprising the glass pane 2, the UV filtering layer means 3, the glass pane 4, the electrochromic layer means 5, the inner glass pane 6, the polyurethane layer 7, and the polycarbonate layer 8. All these panes and layers have a high transparency of visible light.

The UV filtering layer means 3 has a first outer polyurethane layer 3.1 adjoining the outer glass pane 2, a second inner polyurethane layer 3.3 adjoining the middle glass pane 4, and a UV filtering layer 3.2 being arranged between the polyurethane layers 3.1 and 3.3. The whole UV filtering layer means 3 may be arranged as a foil and it reflects UV radiation in a wavelength range of approximately 300 nm to 400 nm.

The UV filtering layer 3.2 comprises a cholesteric layer containing a mixture having a chiral component and a nematic component, the chiral component having a concentration of approximately 0.031 in molar fraction or molar relation and the nematic component having a concentration of approximately 0.969 in molar fraction or molar relation. The wavelengths of the reflection maximum of this mixture amounts to approximately 350 nm whereby high reflection ability is obtained in UV radiation wavelengths range from 300 nm up to 400 nm. The nematic component comprises a nematic monomer having the formula N1

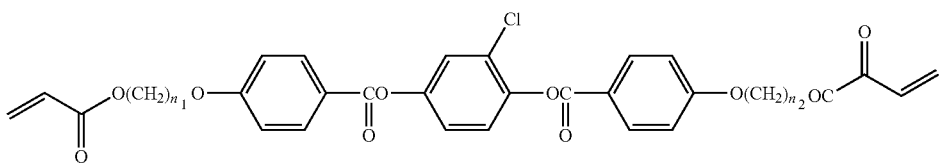

and/or N2

-continued

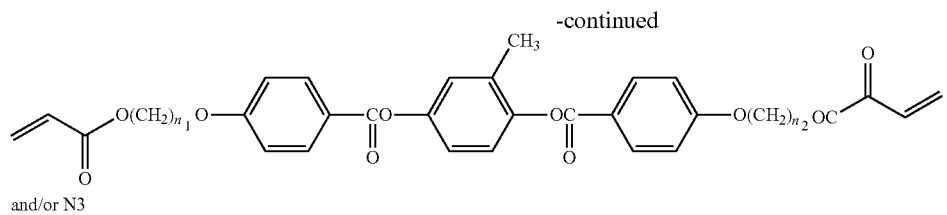
and/or N3

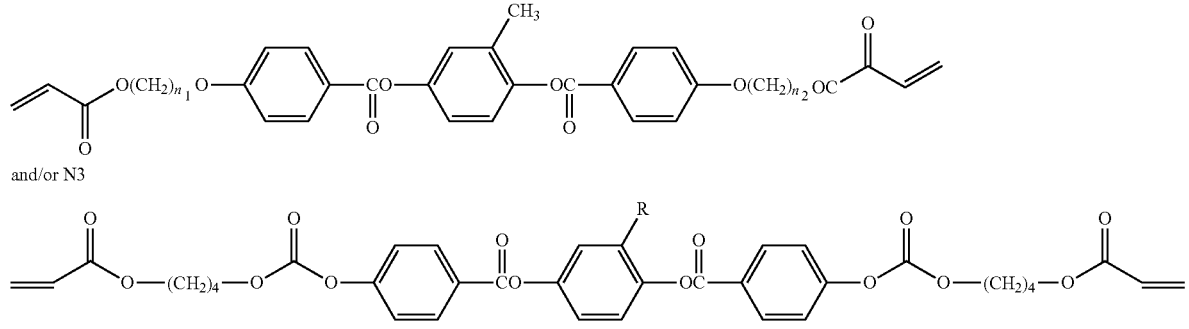
15

With R=H, Cl or CH$_3$ and n$_1$ and n$_2$ are respectively 2, 4, 6, etc. in a preferred embodiment. The chiral component comprises a compound with the formula C1

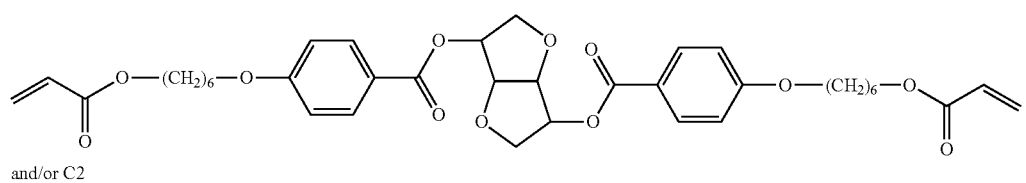
and/or C2

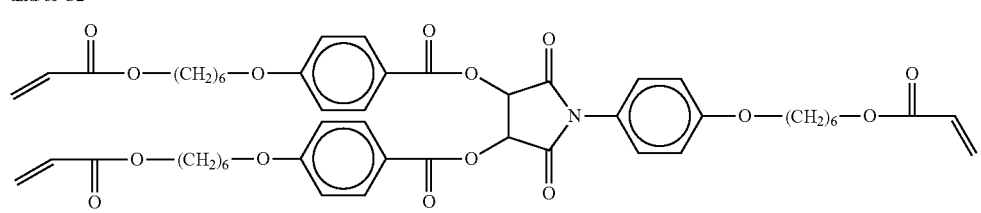

The UV filtering layer 3.2 may comprise additional components like diluents, photo initiators, bonding agents and levelling agents in small amounts.

Before the whole bullet proof pane 1 is produced as a laminate using heat and pressure in an autoclave, the UV filtering layer means 3 is produced as a foil 23. During production, a cholesteric UV filtering layer 3.2 having a thickness of 30 μm using a wet process is applied on a foil made of thermoplastic polyurethane used as substrate corresponding to the polyurethane layer 3.1 by using, for instance, a doctor blade. The cholesteric layer 3.2 contains a mixture comprising the nematic monomer of formula N1 and the chiral component of formula C1, wherein the concentration of the nematic monomer N1 amounts to approximately 0.969 in molar fraction and wherein the concentration of the chiral component C1 amounts to approximately 0.031 in molar fraction. Cellulose acetate butyral is added to improve the building of the layer. Butyl acetate is used as solvent. 2,4,6-trimethylbenzoyldiphenylphosphine oxide is added to the mixture in small concentration as photo initiator. After applying the cholesteric mixture, a UV light source is used for radiating after the solvent was lost in order to obtain a curing of the layer. Then a further foil 3.3 made of thermoplastic polyurethane is arranged on the UV filtering layer 3.2 to prepare the foil 23 as UV filtering layer means 3.

The electrochromic layer means 5 has a first substrate layer 5.1, a second substrate layer 5.5, a first electrode layer 5.2, a second electrode layer 5.4, and an electrochromic layer 5.3 being arranged between the first electrode layer 5.2 and the second electrode layer 5.4, all connected in a laminate. The layers 5.2, 5.3, and 5.4 are provided between the substrate layers 5.1 and 5.5 being opposite to each other.

The substrate layers 5.1 and 5.5 and also the layers 3.1 and 3.3 can respectively consist of thermoplastic material or foil material as, for instance, polyethylene terephtalate (PET), polymethyl methacrylate (PMMA), polycarbonate (PC), polyvinyl butyral (PVB), or ethylene-vinyl acetate (EVA), or preferably polyurethane (PU). The electrode layers 5.2 and 5.4 contain, for instance, indium tin oxide. The electrochromic layer 5.3 comprises a light valve suspension as, for instance, it is described in DE 10 2008 030 441 B3 and DE 696 09 275 T2 or an electrochromic compound that, for instance, comprises 1,1'-dimethyl-4,4'-dipyridine diperchlorate, 2-terbutylanthraquinone and 5.10-hydro-5.10-dimethylphenazine in γ-butyrolactone with a light sensitive component as it is described in detail in DE 698 10 776 T2 together with further examples. The electrochromic layer 5.3 has a thickness of approximately 0.150 mm.

The electrochromic layer 5.3 is transparent for light in the visible spectral range of the sunlight by applying an electrical voltage of the voltage source 5.8 via the electrical conductors 5.6 and 5.7 to the electrode layers 5.2 and 5.4, respectively. Conversely, the electrochromic layer 5.3 is getting nontransparent or opaque if no electrical voltage is supplied to the electrode layers 5.2 and 5.4. The electrochromic layer means 5 is provided preferably in the form of a laminated foil at the beginning of the production of the bullet proof glass pane 1.

The thicknesses of the outer glass pane 2 and the middle glass pane 4 could amount to 4 mm, respectively, and the thickness of the inner glass pane may be 6 mm. The thicknesses of the polyurethane layers 3.1, 3.3, 5.1 and 5.5 each may be 1 mm. The thickness of the polyurethane layer 7 may be 1.9 mm and the thickness of the polycarbonate layer 8 may be 2.5 mm.

FIG. 4 shows a schematic partial section view of a glass pane construction of the invention in a further exemplified embodiment of the invention in the form of a bullet proof pane 1.1 having an electrochromic layer means 5 and a UV filtering layer means 3.5. The bullet proof glass pane 1.1 is constructed as a laminated pane and it may be used, for instance, as a window of an automobile.

The bullet proof glass pane 1.1 of the invention has laminated glass panes 2, 4 and 6 wherein the inner glass pane 6 is arranged inside of the vehicle, the outer glass pane 2 is arranged outside of the vehicle and the middle glass pane is arranged between the outer glass pane 2 and the inner glass pane 6. An outer face 10 of the bullet proof glass pane 1 and, therefore, the side of the vehicle onto which bullets strike is marked by the arrow A in FIG. 4 which is directed onto the outer glass pane 2. The UV filtering layer means 3.5 extends between the outer glass pane 2 and the middle glass pane 4 which is constructed by multiple layers and which reflects ultra violet (UV) radiation being comprised by the spectrum of the natural sunlight that impinges onto the outer face 10 of the bullet proof glass pane 1.1. The electrochromic layer means 5 is arranged between the middle glass pane 4 and the inner glass pane 6 which is constructed by multiple layers and which has a light transparency being controlled or switched by a voltage source 5.8 being applied. The electrochromic layer means 5 has the same shape as the UV filtering layer means 3.5. A sequence of layers comprising a polyurethane layer 7 and a pane 8 made of polycarbonate in this sequence may be formed on the inner face of the inner glass pane 6 in this sequence in the same shape. An inner side 11 of the bullet proof pane 1.1 corresponds to the inner face of the polycarbonate pane 8. The bullet proof glass pane 1.1 consequently has a layered construction seen from outside to inside comprising the glass pane 2, the UV filtering layer means 3.5, the glass pane 4, the electrochromic layer means 5, the inner glass pane 6, the polyurethane layer 7, and the polycarbonate layer 8. All these panes and layers have a high transparency for visible light.

The UV filtering layer means 3.5 has a first outer polyurethane layer 3.51 or another thermoplastic foil adjoining the outer glass pane 2, a second inner polyurethane layer 3.55 or another thermoplastic foil adjoining the middle glass pane 4, and a UV filtering layer 3.56 being arranged between the polyurethane layers 3.51 and 3.55 in a laminate. The whole UV filtering layer means 3.5 may be arranged as a separate foil before assembling the bullet proof pane 1.1 and it reflects UV radiation of the sun spectrum in a range of the wavelength of approximately 300 nm to 400 nm.

The UV filtering layer 3.5 comprises a first cholesteric layer 3.52 and a second cholesteric layer 3.54 each containing a mixture having a chiral component and a nematic component, and each having the same handedness and pitch, wherein the chiral component having a concentration of approximately 0.031 in molar fraction and the nematic component having a concentration of approximately 0.969 in molar fraction. The wavelength of the reflection maximum of this mixture amounts to approximately 350 nm whereby high reflection ability is obtained in the UV radiation wavelength range from 300 nm up to 400 nm. The nematic component comprises a nematic monomer having the formula N1 and/or N2 and/or N3 as it was described in detail with regard to FIG. 1 or 3. The chiral component comprises a compound having the formula C1 and/or C2. The cholesteric layers 3.52 and 3.54 respectively may contain additional components like solvents, photo initiators, bonding agents and levelling agents in small amounts.

The UV filtering layer 3.5 comprises a $\lambda/2$ foil 3.53 or $\lambda/2$ layer or $\lambda/2$ plate which is arranged between the first cholesteric layer 3.52 and the second cholesteric layer 3.54 in a laminated arrangement. The $\lambda/2$ foil 3.53 reverts the direction of circulation of the circular polarised UV radiation passing there through. This three layer construction of the UV filtering layer 3.5 provides very high values of UV reflection between 80 and 90% and values of transmittance in the visible spectrum or light of more than 90%.

The UV filtering layer means 3.5 is produced as a foil 33 before the whole bullet proof glass pane 1.1 is laminated in an autoclave. During the production of the UV filtering foil, the cholesteric layer 3.52 or UV filtering layer is applied on a foil made of thermoplastic polyurethane or another thermoplastic material being used as substrate according to the polyurethane layer 3.51 by using, for instance, a doctor blade in a thickness of 30 µm using a wet process. The cholesteric layer 3.52 contains a mixture comprising the nematic monomer of formula N1 and the chiral component of formula C1, wherein the concentration of the nematic monomer N1 amounts to approximately 0.969 in molar fraction and wherein the concentration of the chiral component C1 amounts to approximately 0.031 in molar fraction. Cellulose acetate butyral is added to improve the building of the layer. Butyl acetate is used as solvent. 2,4,6-trimethyl-benzoyldiphenylphosphine oxide is added to the mixture in small concentration as photo initiator. After depositing the cholesteric mixture, a UV light source is used for radiating after the solvent was lost in order to obtain a curing of the layer. Thereafter the $\lambda/2$ foil 3.53 is put on the cholesteric layer 3.52.

The second cholesteric layer 3.54 is then applied on the $\lambda/2$ foil 3.53 again by using, for instance, a doctor blade in a thickness of 30 µm using a wet process. The second cholesteric layer 3.54 also contains a mixture comprising the nematic monomer of formula N1 and the chiral component C1 wherein also in this case the concentration of the nematic monomer N1 amounts to approximately 0.969 in molar fraction and wherein the concentration of the chiral component amounts to approximately 0.031 in molar fraction. Cellulose acetate butyral is added to improve the building of the layer. Butyl acetate is used as solvent. 2,4,6-trimethyl-benzoyldiphenylphosphine is used as photo initiator, in the mixture in small concentration.

After depositing of the second cholesteric layer 3.54, a further foil 3.55 made of thermoplastic polyurethane or another thermoplastic material is deposited on the second cholesteric layer 3.54 after escape of the solvent to produce the UV filtering layer means 3.5 as a foil 33.

The electrochromic layer means 5 is constructed like the electrochromic layer means of FIG. 3 and is identical in function thereto. It comprises a first substrate layer 5.1, a second substrate layer 5.5, a first electrode layer 5.2, a second electrode layer 5.4, and an electrochromic layer 5.3 in a laminate which is arranged between the first electrode layer 5.2 and the second electrode layer 5.4. The layers 5.2, 5.3 and 5.4 are placed between the substrate layers 5.1 and 5.5 being opposite to each other.

FIG. 5 shows a schematic partial section view of a glass pane construction of the invention in a further exemplified embodiment of the invention in the form of a bullet proof glass pane 1.3 having an electrochromic layer means 5.65 and a UV filtering layer means 3.63. The bullet proof pane 1.3 is a transparent laminated pane and it may be used as a window of an automobile.

The bullet proof glass pane 1.3 of the invention has a glass pane 2 outside of the vehicle and an inner glass pane. An outer face 10 of the bullet proof pane 1.3 and, therefore, the side of the vehicle onto which bullets strike on is marked by the arrow A in FIG. 5 which is directed to the outer glass pane 2. The UV filtering layer means 3.63, a polyurethane layer 9, and an electrochromic layer means 5.65 in this sequence which are in a laminate to each other and to the glass panes 2 and 6 extend between the outer glass pane 2 and the inner glass pane 6. Another thermoplastic material may be used instead of the polyurethane layer 9.

The UV filtering layer means 3.63 is constructed by multiple layers and reflects ultra violet (UV) radiation comprised in the spectrum of the natural sunlight which impinges on the outer face 10 of the bullet proof glass pane 1.3 in the direction of the arrow A. The electrochromic layer means 5.65 is constructed also by multiple layers and it has again a transparency of light that can be controlled or switched by means of a voltage source 5.8 being applied. The electrochromic layer means 5.65 is identical in shape to the UV filtering layer means 3.63. On an inner face of the inner glass pane 6 a layered sequence of a polyurethane layer 7 and of a polycarbonate layer 8 in this sequence may be arranged. Consequently, the bullet proof glass pane 1.3 has a layered construction seen from outside to inside comprising the glass pane 2, the UV filtering layer means 3.63, the polyurethane layer 9, the electrochromic layer means 5.65, the inner glass pane 6, the polyurethane layer 7, and the polycarbonate layer 8. All these panes and layers have a high transparency for visible light and form together a laminate.

The UV filtering layer means 3.63 has an outer polyurethane layer 3.61 or another thermoplastic foil that adjoins the outer glass pane 2, and a UV filtering layer 3.62 that adjoins to the polyurethane layer 9 or another thermoplastic foil.

The UV filtering layer 3.62 is a cholesteric layer that comprises a mixture from a chiral component and a nematic component, wherein the chiral component having a concentration of approximately 0.031 in molar fraction or molar relation and the nematic component having a concentration of approximately 0.969 in molar fraction or molar relation. The wavelength of the reflection maximum of this mixture amounts to approximately 350 nm whereby high reflection ability is obtained in the UV radiation wavelength range from 300 nm up to 400 nm. The nematic component comprises a nematic monomer having the formula N1 and/or N2 and/or N3 as it was described in detail with regard to FIG. 1 or 3. The chiral component comprises a compound having the formula C1 and/or C2. The cholesteric layer 3.62 may contain additional components like solvents, photo initiators, bonding agents, and levelling agents in small amounts.

The electrochromic layer means 5.65 is identical in function to the electrochromic layer means 5 of FIG. 1. It comprises a first electrode layer 5.61, a second electrode layer 5.63, and an electrochromic layer 5.62 in a laminate which is arranged between the first electrode layer 5.61 and the second electrode layer 5.63. The first electrode layer 5.61 is arranged on the polyurethane layer 9 that, therefore, provides a common substrate layer for the first electrode layer 5.61 and the cholesteric layer 3.62.

Before the whole bullet proof glass pane 1.3 is produced and laminated in an autoclave, the UV filtering layer means 3.63 is produced together with the electrochromic layer means 5.65 and the common polyurethane layer 9 as an integrated foil 13.

During production of the foil 13, in a first step, the cholesteric layer 3.62 or the UV filtering layer is applied on a foil made of thermoplastic polyurethane or another thermoplastic material being used as substrate according to the polyurethane layer 3.61 by using, for instance, a doctor blade in a thickness of 30 µm using a wet process. The cholesteric layer 3.62 contains like in FIG. 1 a mixture comprising the nematic monomer of formula N1 and the chiral component of formula C1, wherein the concentration of the nematic monomer N1 amounts to approximately 0.969 in molar fraction and wherein the concentration of the chiral component C1 amounts to approximately 0.031 in molar fraction. Cellulose acetate butyral is added to improve the forming of the layer. Butyl acetate is used as solvent. 2,4,6-trimethylbenzoyldiphenylphosphine oxide is added to the mixture in small concentration as photo initiator. After depositing the cholesteric mixture, a UV light source is used for radiation to obtain curing of the layer after the solvent was lost. After the curing of the cholesteric layer 3.63, the polyurethane layer 9 being a foil is put thereon.

Then the first electrode layer 5.61 of the electrochromic layer means 5.65 is produced on the polyurethane layer 9 on which thereafter the electrochromic layer 5.62 is arranged. Finally, the second electrode layer 5.63 and the substrate layer 5.64 are arranged in this sequence on the electrochromic layer 5.62 to form the combined foil 13 comprising UV filtering layer means 3.63, the common polyurethane layer 9, and electrochromic layer means 5.65.

The invention claimed is:

1. Glass pane construction, having several transparent panes and layers made of glass, ceramic, or synthetic material, which are connected in a layered manner in a laminate for providing a laminated window, comprising:

a laminated transparent UV reflecting foil for reflecting of ultraviolet (UV) radiation, the UV reflecting foil comprising an outer thermoplastic layer, an inner thermoplastic layer, and at least one cholesteric layer between the outer thermoplastic layer and the inner thermoplastic layer, the at least one cholesteric layer has a mixture of a chiral component and a nematic component, the chiral component having a concentration of approximately 0.031 in molar fraction and the nematic component having a concentration of approximately 0.969 in molar fraction, wherein a UV wavelength of a reflection maximum of this mixture amounts to approximately 350 nanometers (nm) to reflect UV radiation in a wavelength range from 300 nm to 400 nm;

an outer pane made of glass or glass ceramic is provided and the outer thermoplastic layer of the UV reflecting foil adjoins directly the outer pane; and a laminated electrically controllable or switchable electrochromic foil for electrical controlling or switching of a light transparency of the glass pane construction, the electrically controllable or switchable electrochromic foil comprising:
   a first thermoplastic substrate layer,
   a second thermoplastic substrate layer,
   a first electrode layer,
   a second electrode layer, and
   an electrochromic layer between the first and second electrode layers, wherein the first electrode layer, the electrochromic layer, and the second electrode layer are between the first thermoplastic substrate layer and the second thermoplastic substrate layer.

2. Glass pane construction according to claim 1, characterized in that the UV reflecting foil comprising in a laminate the outer thermoplastic layer, a first cholesteric layer, a second cholesteric layer, a $\lambda/2$ layer between the first cholesteric layer and the second cholesteric layer, wherein the $\lambda/2$ layer reverses the circular polarisation of the impinging UV radiation and both cholesteric layers having equal or unequal pitch and/or equal or unequal handedness or the same pitch and handedness, and the inner thermoplastic layer wherein a sequence of the first cholesteric layer, the $\lambda/2$ layer, and the second cholesteric layer is between the outer thermoplastic layer and the inner thermoplastic layer.

3. Glass pane construction according to claim 1, characterized by the outer pane and at least one further pane of glass, glass ceramic, or synthetic material, wherein the UV reflecting foil is arranged between the outer pane and the at least one further pane in a laminate, the inner thermoplastic layer of the UV reflecting foil adjoins the at least one further pane.

4. Glass pane construction according to claim 1, characterized in that the UV reflecting foil is provided before laminating of the whole glass pane construction.

5. Glass pane construction according to claim 4, characterized in that the UV reflecting foil comprises at least one cured cholesteric layer comprising a cholesteric compound or a cholesteric mixture of compounds that are selected from:
at least one cholesteric polymerisable monomer;
at least one achiral, nematic polymerisable monomer and a chiral compound;
at least one cholesteric polymerisable polymer;
at least one cholesteric polymer in a polymerisable diluent;
at least one cholesteric polymer whose cholesteric face can be frozen in by rapid cooling to below the glass transition temperature; and/or
at least one achiral liquid crystalline cross linkable polymer and a chiral compound.

6. Glass pane construction according to claim 1, characterized by a laminated combined foil comprising the UV reflecting foil and the electrically controllable or switchable electrochromic foil, wherein the inner thermoplastic layer of the UV reflecting foil and the first thermoplastic substrate layer are combined to a common thermoplastic layer.

7. Glass pane construction according to claim 1, further comprising substrate layers and thermoplastic layers, wherein the substrate layers and the thermoplastic layers consist respectively of a thermoplastic material or foil material like polyethylene terephtalate (PET), polymethyl methacrylate (PMMA), polycarbonate (PC), polyvinyl butyral (PVB) or ethylene-vinyl acetate (EVA) or polyurethane (PU).

8. Glass pane construction according to claim 1, characterized in that the glass pane construction is a bullet proof glass pane to be used in a motor vehicle.

9. Glass pane construction being a laminated bullet proof glass pane usable in a motor vehicle, comprising:
an inner glass pane arranged inside of the motor vehicle;
an outer glass pane arranged outside of the motor vehicle; and
a middle glass pane arranged between the outer glass pane and the inner glass pane;
wherein a transparent UV reflecting foil extends between the outer glass pane and the middle glass pane, wherein the UV reflecting foil adjoins directly the outer glass pane and the UV reflecting foil has:
an outer thermoplastic foil adjoining the outer glass pane,
an inner thermoplastic foil adjoining the middle glass pane, and
a UV reflecting layer arranged between the outer and inner thermoplastic foils and comprising at least one cholesteric layer that has a mixture of a chiral component and of a nematic component, the chiral component having a concentration of approximately 0.031 in molar fraction and the nematic component having a concentration of approximately 0.969 in molar fraction, wherein a UV wavelength of a reflection maximum of this mixture amounts to approximately 350 nanometers (nm) to reflect UV radiation in a wavelength range from 300 nm to 400 nm; and
an adhesive layer arranged between the middle glass pane and the inner glass pane.

10. Glass pane construction being a laminated bullet proof glass pane usable in a motor vehicle, comprising:
an inner glass pane arranged inside of the motor vehicle;
an outer glass pane arranged outside of the motor vehicle; and
a middle glass pane arranged between the outer glass pane and the inner glass pane;
wherein a transparent UV reflecting foil extends between the outer glass pane and the middle glass pane, wherein the UV reflecting foil adjoins directly the outer pane and the UV reflecting foil has:
an outer thermoplastic foil adjoining the outer glass pane,
an inner thermoplastic foil adjoining the middle glass pane, and
a UV reflecting layer arranged between the outer and inner thermoplastic foils and comprising at least one cholesteric layer that has a mixture of a chiral component and a nematic component, the chiral component having a concentration of approximately 0.031 in molar fraction and the nematic component having a concentration of approximately 0.969 in molar fraction, wherein a UV wavelength of a reflection maximum of this mixture amounts to approximately 350 nanometers (nm) to reflect UV radiation in a wavelength range from 300 nm to 400 nm; and
an electrically controllable or switchable electrochromic layer means foil for electrically controlling or switching of light transparency of the glass pane construction, wherein the electrochromic foil is between the middle glass pane and the inner glass pane, the electrochromic foil has:
a first substrate layer,
a second substrate layer,
a first electrode layer,
a second electrode layer, and
an electrochromic layer arranged between the first electrode layer and the second electrode layer, wherein the first electrode layer, the electrochromic layer, and the second electrode layer are provided between the first substrate layer and the second substrate layer.

11. Glass pane construction being a laminated bullet proof glass pane usable in a motor vehicle, comprising:
an inner glass pane arranged inside of the motor vehicle,
an outer glass pane arranged outside of the motor vehicle, and
a common substrate layer arranged between the outer glass pane and the inner glass pane;
a transparent UV reflecting foil extending between the outer glass pane and the common substrate layer, wherein the UV reflecting foil adjoins directly the outer glass pane and the UV reflecting foil has:

an outer thermoplastic foil adjoining the outer glass pane, and a UV reflecting layer arranged between the outer thermoplastic foil and the common substrate layer and comprising at least one cholesteric layer that has a mixture of a chiral component and of a nematic component, the chiral component having a concentration of approximately 0.031 in molar fraction and the nematic component having a concentration of approximately 0.969 in molar fraction, wherein a UV wavelength of a reflection maximum of this mixture amounts to approximately 350 nanometers (nm) to reflect UV radiation in a wavelength range from 300 nm to 400 nm; and an electrically controllable or switchable electrochromic foil for electrically controlling or switching of light transparency of the glass pane construction, wherein the electrochromic foil is between the common substrate layer and the inner glass pane, and the electrochromic foil has:

a first electrode layer adjoining the common substrate layer, a second electrode layer, an electrochromic layer arranged between the first electrode layer and the second electrode layer, and a further substrate layer adjoining the inner glass pane, wherein the first electrode layer, the electrochromic layer, and the second electrode layer are provided between the common substrate layer and the further substrate layer.

* * * * *